UNITED STATES PATENT OFFICE.

ALFRED DACHERT, OF STRASSBURG, AND CHARLES HEITZ, OF SCHILTIGHEIM, GERMANY.

COLORING MEDIUM FOR CONCENTRATED VISCOUS SUGAR.

1,172,113. Specification of Letters Patent. Patented Feb. 15, 1916.

No Drawing. Application filed February 10, 1914. Serial No. 817,878.

*To all whom it may concern:*

Be it known that we, ALFRED DACHERT, director, and Dr. CHARLES HEITZ, analytical chemist, subjects of the German Emperor, residing, respectively, at Strassburg and at Schiltigheim, Imperial Province of Alsace, German Empire, have invented certain new and useful Improvements in Coloring Mediums for Concentrated Viscous Sugar, and More Particularly Caramels, and Processes for Preparing the Same, of which the following is a specification.

It is exceedingly difficult to uniformly and rapidly distribute the color added to thick viscous caramel or other sugar mixtures, which are almost free from water. For coloring such mixtures, coloring materials which are soluble in water are principally used. Such materials are used in a pasty condition in order to prevent as far as possible the undesirable addition of water to the sugar. But due to the water contained in the color, working with paste colors has the drawback that the utensils and objects immediately adjacent become smeared with color. Paste color is also difficult to divide into pre-determined portions and apart from these considerations, the color effect is substantially dependent upon the degree of the distribution of the color when kneading the sugar mixture, so that even when added in uniform quantity, the caramel or sugar is still non-uniformly colored.

Experiments which have been undertaken have shown that the color may be remarkably well and more thoroughly distributed by adding certain materials, and for this purpose these materials come into consideration which can be easily distributed, especially in caramel and sugar mixtures and by means of which the coloring medium becomes readily diffusible. As instances of such material, sugar or caramel themselves are of importance as well as gelatin or gelatinous masses or a mixture containing these or similar materials. The coloring material may be so bound with these materials by intimate mixing, that the mixture may be added in an almost dry condition to the sugar or caramel mixture to be colored and yet a complete distribution of the color attained. In these mixtures, the color is in a colloidal condition and thus possesses a considerably increased coloring capacity when compared with unmixed coloring material.

In manufacturing the coloring medium an exactly weighed or otherwise measured quantity of color is dissolved in water with the quantity of sugar or gelatin or both calculated for the determined proportion. By concentrating the solution in a vacuum or in the open air at the lowest possible temperature the mass is freed from moisture to such a degree that it may be formed into tablets. Tablets of equal size are then produced, and a definite number thereof are used for coloring definite quantities of sugar or caramel. The productions of the tablets, when using caramel as the receiving medium for the coloring material, may be performed by preparing the concentrated, almost dry, coloring mixture in the same manner as is usual in the case of caramel. Coloring tablets in the form of caramel bonbons are then produced. When such tablets are mixed with sugar or with caramel, the tablets fall to pieces and the smallest pieces thereof rapidly dissolve into the surrounding mass. The coloring tablets thus produced allow the color to be exactly divided into definite quantities so that exact and uniform color of a definite quantity of caramel or sugar mixture can be effected in a clean manner. The use of these tablets also prevents the undesirable addition of water to the mass.

Thus it will be seen that this process consists in producing substantially dry tablets of uniform size, which are of such a friable nature that they readily fall to pieces when kneaded with a sugar or caramel mass so that they may be thoroughly and intimately mixed with the mass and that these tablets contain coloring matter in a colloidal condition susceptible of easy solution in caramel and sugar mixtures.

What is claimed is:

That process of producing coloring tablets for candy which consists in producing an aqueous solution of sugar, gelatin and a color soluble in sugar mixtures, concentrating the solution to such degree that the mass may be formed into tablets, and dividing the mass thus formed into tablets.

In testimony whereof we affix our signatures in presence of two witnesses.

ALFRED DACHERT.
DR. CHARLES HEITZ.

Witnesses:
MILO A. JEWETT,
JACOB W. SCHMIDT.